(12) United States Patent
Naito

(10) Patent No.: US 11,876,888 B2
(45) Date of Patent: Jan. 16, 2024

(54) ENCRYPTION DEVICE, DECRYPTION DEVICE, ENCRYPTION METHOD, DECRYPTION METHOD, AND COMPUTER READABLE MEDIUM

(71) Applicant: Mitsubishi Electric Corporation, Tokyo (JP)

(72) Inventor: Yusuke Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 31 days.

(21) Appl. No.: 17/841,080

(22) Filed: Jun. 15, 2022

(65) Prior Publication Data
US 2022/0321322 A1 Oct. 6, 2022

Related U.S. Application Data

(63) Continuation of application No. PCT/JP2020/004526, filed on Feb. 6, 2020.

(51) Int. Cl.
*H04L 9/06* (2006.01)
(52) U.S. Cl.
CPC .................. *H04L 9/0618* (2013.01)
(58) Field of Classification Search
CPC .................. H04L 9/0618; H04L 9/0637
See application file for complete search history.

(56) References Cited

U.S. PATENT DOCUMENTS

| | | |
|---|---|---|
| 2001/0021253 A1 | 9/2001 | Furuya et al. |
| 2001/0021254 A1 | 9/2001 | Furuya et al. |
| 2007/0064944 A1 | 3/2007 | Furuya et al. |
| 2007/0245147 A1 | 10/2007 | Okeya |
| 2009/0196416 A1 | 8/2009 | Minematsu |
| 2010/0246809 A1* | 9/2010 | Noda .................. H04L 9/0637 380/28 |

(Continued)

FOREIGN PATENT DOCUMENTS

| | | |
|---|---|---|
| JP | 2001-324925 A | 11/2001 |
| JP | 2005-27358 A | 1/2005 |

(Continued)

OTHER PUBLICATIONS

Tweakable block ciphers by Rivest et al., published 2002 (Year: 2002).*

(Continued)

*Primary Examiner* — Vu V Tran
(74) *Attorney, Agent, or Firm* — Birch, Stewart, Kolasch & Birch, LLP

(57) ABSTRACT

A division unit (22) divides a plaintext M every b bits from a beginning, thereby generating b-bit values $M_1, \ldots, M_{m-1}$ and a value $M_m$ having 1 or more bits to b or less bits. An S1 calculation unit (241) assigns a b-bit value $H_1$ to a value $M_0$, and for each integer i of $i=1, \ldots, m$ in an ascending order, takes a value $M_{i-1}$ as input to an encryption function E, thereby calculating a value $S_1(i)$, and calculates a value $C_i$ from the value $S_1(i)$ and a value $M_i$. An S2 calculation unit (242) assigns an r-bit value $H_2$ to a value $S_2(0)$, and for each integer i of $i=1, \ldots, m$ in an ascending order, calculates a value $S_2(i)$ from the value $S_1(i)$ and from a value $S_2(i-1)$. A ciphertext generation unit (243) generates a ciphertext C from a value $C_i$ for each integer i of $i=1, \ldots, m$. An authenticator generation unit (25) generates a (b+r)-bit authenticator T by using a value $S_1(m)$ and a value $S_2(m)$.

16 Claims, 15 Drawing Sheets

(56) References Cited

U.S. PATENT DOCUMENTS

| | | | |
|---|---|---|---|
| 2011/0123020 A1* | 5/2011 | Choi | H04L 9/0637 380/28 |
| 2011/0211691 A1 | 9/2011 | Minematsu | |
| 2012/0314857 A1* | 12/2012 | Minematsu | H04L 9/0618 380/44 |
| 2021/0266143 A1* | 8/2021 | Boue | H04L 9/0637 |

FOREIGN PATENT DOCUMENTS

| | | |
|---|---|---|
| JP | 2007-288514 A | 11/2007 |
| JP | 2007-316108 A | 12/2007 |
| JP | 4752239 B2 | 8/2011 |
| JP | 5182091 B2 | 4/2013 |
| JP | 5402832 B2 | 1/2014 |
| WO | WO 2008/018303 A1 | 2/2008 |
| WO | WO 2009/020060 A1 | 2/2009 |

OTHER PUBLICATIONS

Beierle et al., "The SKINNY Family of Block Ciphers and its Low-Latency Variant Mantis," Crypto 2016, Springer, Proceedings, Part II, Lecture Notes in Computer Science, vol. 9815, 2016, pp. 1-53.

International Search Report (PCT/ISA/210) issued in PCT/JP2020/004526, dated Apr. 14, 2020.

Iwata et al., "Breaking and Repairing GCM Security Proofs," Crypto 2012, Springer, Proceedings, Lecture Notes in Computer Science, vol. 7417, 2012, pp. 1-26.

Iwata et al., "Duel of the Titans: The Romulus and Remus Families of Lightweight AEAD Algorithms," IACR Cryptology ePrint Archive 2019/992, 2019, pp. 1-78.

Jean et al., "Tweaks and Keys for Block Ciphers: the TWEAKEY Framework," ASIACRYPT, Springer, Proceedings, Part II, Lecture Notes in Computer Science, vol. 8874, 2014, pp. 274-288 (total 18 pages).

Krovetz et al., "The Software Performance of Authenticated-Encryption Modes," Fast Software Encryption, Springer, Lecture Notes in Computer Science, vol. 6733, 2011, pp. 1-24.

Naito et al., "Lightweight Authenticated Encryption Mode of Operation for Tweakable Block Ciphers," IACR Trans. Cryptogr. Hardw. Embed. Syst., vol. 2020, No. 1, 2020, pp. 66-94.

* cited by examiner

ENCRYPTION DEVICE, DECRYPTION DEVICE, ENCRYPTION METHOD, DECRYPTION METHOD, AND COMPUTER READABLE MEDIUM

CROSS REFERENCE TO RELATED APPLICATIONS

This application is a Continuation of PCT International Application PCT/JP2020/004526, filed on Feb. 6, 2020, which is hereby expressly incorporated by reference into the present application.

TECHNICAL FIELD

The present invention relates to an authenticated cipher algorithm which uses a block cipher.

BACKGROUND ART

An authenticated cipher algorithm is a cipher algorithm that realizes a confidentiality function and a tamper-detection function. When the authenticated cipher algorithm is used, two parties can communicate with each other while concealing messages. Also, the recipient can check whether a sent message is tampered or not.

The authenticated cipher algorithm includes two algorithms which are an encryption function Enc and a decryption function Dec.

The encryption function Enc is a function that takes as input a private key K, a nonce N, open data A, and a plaintext M and outputs a ciphertext C and a tamper-detecting authenticator T. As the nonce N, a different value is used for each encryption, and the same value is not used unless the private key K is changed.

The decryption function Dec takes as input the private key K, the nonce N, the open data A, the ciphertext C, and a tamper-detection authenticator T. If the input value is not tampered, the decryption function Dec outputs the plaintext M. If the input value is tampered, the decryption function Dec outputs a value indicating that the input value is forged. The value indicating that the input value is forged will be expressed as $\bot$ hereinafter.

Assume that a sender Alice and a recipient Bob are to perform communication using the authenticated cipher algorithm. The private key K is shared by the sender Alice and the recipient Bob in advance.

The sender Alice takes as input the private key K, the nonce N, the open data A, and the plaintext M, and calculates the ciphertext C and the tamper-detection authenticator T with using the encryption function Enc. Then, the sender Alice sends the nonce N, the open data A, the ciphertext C, and the tamper-detection authenticator T to the recipient Bob.

The recipient Bob takes the private key K, the nonce N, the open data A, the ciphertext C, and the tamper-detection authenticator T, as input to the decryption function Dec. If none of the nonce N, the open data A, the ciphertext C, and the tamper-detection authenticator T is tampered, the decryption function Dec outputs the plaintext M.

The open data A is a value that can be open to public. The open data A need not be necessarily used. The sender Alice uses, as the nonce N, a different value for each encryption, and does not use the same value.

Security of an authenticated cipher includes confidentiality and integrity prescribed in Non-Patent Literature 1.

Confidentiality signifies security defining that a plaintext will not be revealed from a ciphertext. In a security game about confidentiality, an attacker accesses either one of an authenticated cipher type encryption function Enc and an oracle which outputs a random number, and the attacker identifies which one he or she is accessing. A probability that the attacker identifies an accessing target correctly is referred to as an identification probability. The lower the identification probability, the higher the confidentiality security.

Integrity signifies security defining that open data or a ciphertext cannot be tampered. In a security game about integrity, an attacker access an encryption function Enc and decryption function Dec of an authenticated cipher type, and inputs forged open data, a forged ciphertext, and a forged authenticator to the decryption function Dec, aiming to pass a tamper check. A probability that the tamper check is passed is referred to as a forging probability. The lower the forging probability, the higher the integrity security.

As a method of constituting the authenticated cipher algorithm, a method that uses a Tweakable block cipher is available.

The Tweakable block cipher is constituted of an encryption function E and a decryption function D. The encryption function E is a function that takes as input a key K, a Tweak value TW, and a b-bit plaintext block M and outputs a b-bit ciphertext block C. This is expressed as C=E(K, TW, M). The decryption function D of the Tweakable block cipher is a function that takes as input the key K, the Tweak value TW, and the b-bit ciphertext block C and outputs the b-bit plaintext block M. This is expressed as M=D(K, TW, C).

The size b of each of the plaintext block M and the ciphertext block C is referred to as a block size. The encryption function E and decryption function D of the Tweakable block cipher are each turned into a b-bit permutation function by fixing the key K and the Tweak value TW. Normally, a secret value is used as the key K, and an open value is used as the Tweak value TW. A set of Tweak values will be referred to as TWset. A set of keys will be referred to as Kset. That is, the Tweak value TW is selected from TWset, and the key K is selected from Kset.

Non-Patent Literatures 2 and 3 describe an algorithm of a specific Tweakable block cipher.

Non-Patent Literature 2 describes examples of specific values of TWset, Kset, and the block size b of the Tweakable block cipher. SKINNY-128-384 described in Non-Patent Literature 2 is a Tweakable block cipher having a 128-bit block size and a Tweak value length and a key length that total to 384 bits. Hence, if the Tweak value has a length of 256 bits, then, block size b=128, Kset=$\{0, 1\}^{128}$, and TWset=$\{0, 1\}^{256}$.

When constituting an authenticated cipher with using a Tweakable block cipher, the encryption function Enc is constituted with using the encryption function E of the Tweakable block cipher, and the decryption function Dec is constituted with using the encryption function E or decryption function D of the Tweakable block cipher.

In designing an authenticated cipher with using a Tweakable block cipher, when proving security of the authenticated cipher, the Tweakable block cipher is replaced by a Tweakable random permutation, as defined in Non-Patent Literature 4.

Among authenticated ciphers using a Tweakable block cipher which are proposed so far, the most secure ones are ΘCB described in Non-Patent Literature 4, PFB described in Non-Patent Literature 5, and Romulus described in Non-Patent Literature 6.

Regarding the confidentiality, the identification probability against these techniques is 0. Regarding the integrity, the forging probability is $q_D/2^b$ for an access number time $q_D$ to the decryption function Dec of the authenticated cipher.

With these authenticated ciphers, the forging probability is smaller than 1 until $q_D$ becomes $2^b$. Thus, the security of the authenticated cipher can be guaranteed until $q_D$ becomes $2^b$. A bit security is a value obtained by applying log 2 to $q_D$ in a case where the probability becomes 1. Hence, each of these authenticated ciphers has a bit security of b bits ($=\log_2 2^b$).

CITATION LIST

Non-Patent Literature

Non-Patent Literature 1: Tetsu Iwata, Keisuke Ohashi, and Kazuhiko Minematsu. Breaking and Repairing GCM Security Proofs. CRYPTO 2012, Proceedings. pages 31-49. Lecture Notes in Computer Science volume 7417. Springer. 2012.

Non-Patent Literature 2: Christof Beierle, Jeremy Jean, Stefan Kolbl, Gregor Leander, Amir Moradi, Thomas Peyrin, Yu Sasaki, Pascal Sasdrich, and Siang Meng Sim. The SKINNY Family of Block Ciphers and Its Low-Latency Variant MANTIS. CRYPTO 2016, Proceedings, Part II. pages 123-153. Lecture Notes in Computer Science volume 9815. Springer, 2016.

Non-Patent Literature 3: Jeremy Jean, Ivica Nikolic, and Thomas Peyrin. Tweaks and Keys for Block Ciphers: The TWEAKEY Framework.ASIACRYPT 2014, Proceedings. Part II. pages 274-288. Lecture Notes in Computer Science volume 8874. Springer. 2014.

Non-Patent Literature 4: Ted Krovetz and Phillip Rogaway. The Software Performance of Authenticated-Encryption Modes. FSE 2011. pages 306-327. Lecture Notes in Computer Science volume 6733. Springer, 2011.

Non-Patent Literature 5: Yusuke Naito and Takeshi Sugawara. Lightweight Authenticated Encryption Mode of Operation for Tweakable Block Ciphers. IACR Trans. Cryptogr. Hardw. Embed. Syst. 2020 volume 1. pages 66-94.

Non-Patent Literature 6: Tetsu Iwata, Mustafa Khairallah, Kazuhiko Minematsu, and Thomas Peyrin. Duel of the Titans: The Romulus and Remus Families of Lightweight AEAD Algorithms. IACR Cryptology ePrint Archive 2019/992.

SUMMARY OF INVENTION

Technical Problem

According to any one of authenticated ciphers described in Non-Patent Literatures 4 to 6, each of which uses a Tweakable block cipher, a b-bit value is updated by the decryption function Dec side likewise. However, since collision of b-bit values is utilized, the integrity of the authenticated cipher is breached. Collision of b-bit values signifies that for two different inputs to an authenticated cipher, the same b-bit value is resulted.

There are $2^b$ of b-bit values. Hence, the integrity can be breached by computing the decryption function Dec $2^b$ times. In other words, a theoretical limit of bit security having an existing-technique configuration is b bits.

According to the authenticated cipher, in order to guarantee the security, keys of the authenticated cipher are updated before the identification probability or forging probability becomes 1. Meanwhile, key update takes time and cost, and accordingly an authenticated cipher in which one key has a long life, that is, an updated frequency is low, is desirable. An authenticated cipher having a lower identification probability and a lower forging probability, that is, a higher bit security, can reduce the key update frequency more.

An objective of the present disclosure is to make feasible an authenticated cipher having a high bit security.

Solution to Problem

An encryption device according to the present disclosure includes:
- an acquisition unit to acquire a plaintext M;
- a division unit to divide the plaintext M acquired by the acquisition unit, every b bits from a beginning, the b bits being a block size of an encryption function E of a block cipher, thereby generating b-bit values $M_1, \ldots, M_{m-1}$ and a value $M_m$ having 1 or more bits to b or less bits;
- an S1 calculation unit to assign a b-bit value $H_1$ to a value $M_0$, and for each integer i of i=1, . . . , m in an ascending order, to take a value $M_{i-1}$ as input to the encryption function E, thereby calculating a value $S_1(i)$, and to calculate a value $C_i$ from the value $S_1(i)$ and a value $M_i$;
- an S2 calculation unit to assign an r-bit value $H_2$ to a value $S_2(0)$, and for each integer i of i=1, . . . , m in an ascending order, to calculate a value $S_2(i)$ from the value $S_1(i)$ calculated by the S1 calculation unit and from a value $S_2(i-1)$;
- a ciphertext generation unit to generate a ciphertext C from a value $C_i$ for each integer i of i=1, . . . , m; and
- an authenticator generation unit to generate a (b+r)-bit authenticator T by using a value $S_1(m)$ and a value $S_2(m)$.

Advantageous Effects of Invention

In the present disclosure, a b-bit value $S_1$ is updated with using an encryption function E. and an r-bit value is updated with using an output of the encryption function E. Thus, for decryption, a configuration of updating a (b+r)-bit value can be employed, and a bit security of (b+r) bits can be achieved.

DESCRIPTION OF EMBODIMENTS

Embodiment 1

*Description of Configurations*

Figure 1:
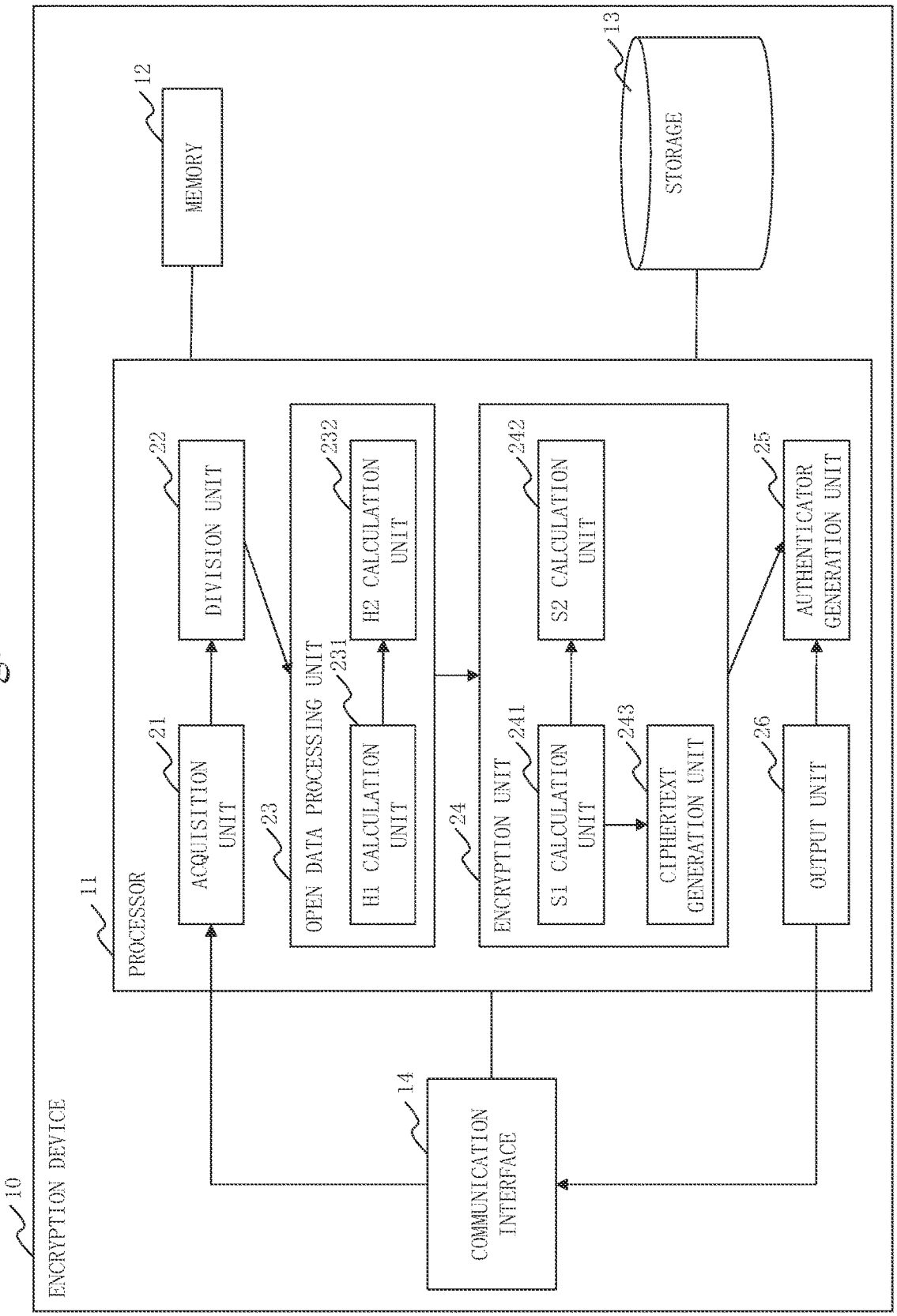
FIG. 1 is a configuration diagram of an encryption device 10 according to Embodiment 1.

A configuration of an encryption device 10 according to Embodiment 1 will be describe with referring to FIG. 1.

The encryption device 10 is provided with hardware devices which are a processor 11, a memory 12, a storage 13, and a communication interface 14. The processor 11 is connected to the other hardware devices via a signal line and controls the other hardware devices.

The encryption device 10 is provided with an acquisition unit 21, a division unit 22, an open data processing unit 23, an encryption unit 24, an authenticator generation unit 25, and an output unit 26, as function constituent elements. The open data processing unit 23 is provided with an H1 calculation unit 231 and an H2 calculation unit 232. The encryption unit 24 is provided with an S1 calculation unit 241, an S2 calculation unit 242, and a ciphertext generation unit 243. Functions of the function constituent elements of the encryption device 10 are implemented by software.

A program that implements the functions of the function constituent elements of the encryption device 10 is stored in the storage 13. This program is read into the memory 12 by the processor 11 and is run by the processor 11. The functions of the function constituent elements of the encryption device 10 are thus implemented.

Figure 2:
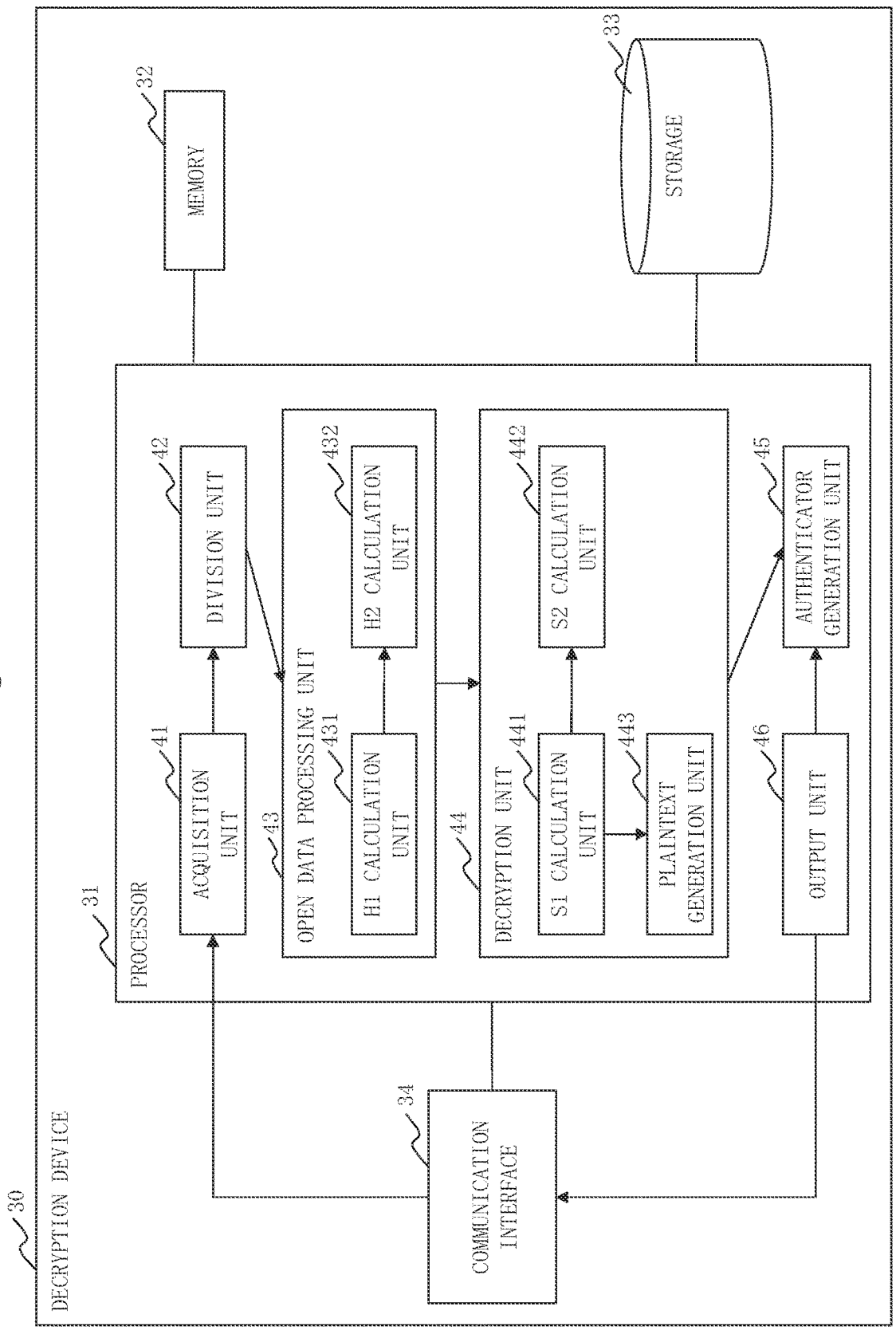
FIG. 2 is a configuration diagram of a decryption device 30 according to Embodiment 1.

A configuration of a decryption device 30 according to Embodiment 1 will be described with referring to FIG. 2.

The decryption device 30 is provided with hardware devices which are a processor 31, a memory 32, a storage 33, and a communication interface 34. The processor 31 is connected to the other hardware devices via a signal line and controls the other hardware devices.

The decryption device 30 is provided with an acquisition unit 41, a division unit 42, an open data processing unit 43, a decryption unit 44, an authenticator generation unit 45, and an output unit 46, as function constituent elements. The open data processing unit 43 is provided with an H1 calculation unit 431 and an H2 calculation unit 432. The decryption unit 44 is provided with an S1 calculation unit 441, an S2 calculation unit 442, and a plaintext generation unit 443. Functions of the function constituent elements of the decryption device 30 are implemented by software.

A program that implements the functions of the function constituent elements of the decryption device 30 is stored in the storage 33. This program is read into the memory 32 by the processor 31 and is run by the processor 31. The functions of the function constituent elements of the decryption device 30 are thus implemented.

The processors 11 and 31 are each an Integrated Circuit (IC) that performs processing. Specific examples of the processors 11 and 31 are a Central Processing Unit (CPU), a Digital Signal Processor (DSP), and a Graphics Processing Unit (GPU).

The memories 12 and 32 are each a storage device that stores data temporarily. Specific examples of the memories 12 and 32 are a Static Random-Access Memory (SRAM) and a Dynamic Random-Access Memory (DRAM).

The storages 13 and 33 are each a storage device that keeps data. A specific example of the storages 13 and 33 is a Hard Disk Drive (HDD). The storages 13 and 33 may be each a portable storage medium such as a Secure Digital (SD) memory card, a CompactFlash (registered trademark, CF), a NAND flash, a flexible disk, an optical disk, a compact disk, a Blu-ray (registered trademark) Disc, and a Digital Versatile Disk (DVD).

The communication interfaces 14 and 34 are each an interface to communicate with an external device. Specific examples of the communication interfaces 14 and 34 are an Ethernet (registered trademark) port, a Universal Serial Bus (USB) port, and a High-Definition Multimedia Interface (HDMI, registered trademark) port.

*Description of Operations*

Operations of the encryption device 10 and decryption device 30 according to Embodiment 1 will be described with referring to FIG. 3 through FIG. 12.

An operation procedure of the encryption device 10 according to Embodiment 1 corresponds to an encryption method according to Embodiment 1. A program that implements the operations of the encryption device 10 according to Embodiment 1 corresponds to an encryption program according to Embodiment 1.

An operation procedure of the decryption device 30 according to Embodiment 1 corresponds to a decryption method according to Embodiment 1. A program that implements the operations of the decryption device 30 according to Embodiment 1 corresponds to a decryption program according to Embodiment 1.

*Definition in Description Below*

A set of values of a nonce N is defined as Nset.

A maximum block number of a plaintext M, a ciphertext C, and open data A is defined as L. A block number is a number of b-bit blocks formed by dividing a bit string of the plaintext M, the ciphertext C, or the open data A every b bits. Note that b bits is a block size in a Tweakable block cipher employed by the encryption device 10 and the decryption device 20.

That is, when a maximum bit length of the plaintext M, the ciphertext C, and the open data A is defined as L*, L is a minimum integer that is equal to or larger than L*/b.

It is defined that const is a fixed value being a certain value included in Nset. Note that const may be any value in Nset. It is defined that const1 is a b-bit fixed value and that const2 is an r-bit fixed value. Note that const 1 may be any b-bit value and that const2 may be any r-bit value. It is defined that r is an integer equal to or larger than 1.

An operator of a per-bit exclusive OR is expressed as xor. For a bit string X, a bit length of X is expressed as |X|.

It is defined that pad is a function that takes as input an input value having a bit length of b or less bits, bit-couples bits of values subsequent to the input value to generate a b-bit value, and outputs the generated b-bit value.

For example, pad(X), signifying an output from pad upon input of a value X having (b−1) or less bits, is a value formed by bit-coupling 1 to follow the value X and then bit-coupling a bit string of 0 to follow 1 such that the bit length becomes b. Also, for example, pad(Y), signifying an output from pad upon input of a b-bit value Y, is Y.

When i is an integer of b or less, trunc[i] is a function that takes as input a b-bit value and outputs an i-bit value that is determined in advance, from among the inputted b bits.

For example, trunc[i] is a function that outputs a most-significant i bit from among the inputted b bits. Also, for example, trunc[i] is a function that outputs a least-significant i bit from among the inputted b bits.

A set of Tweaks of the Tweakable block cipher used by the encryption device 10 and the decryption device 30 is expressed as TW=Nset×$\{1, 2, \ldots, L\}$×$\{1, 2, \ldots, 16\}$. 1, 2, ..., L are different integer values. 1, 2, ..., L suffice as far as they are different integer values and are not limited to integer values 1, 2, ..., L. Likewise, 1, 2, ..., 16 are different integer values. 1, 2, ..., 16 suffice as far as they are different integer values and are not limited to integer values 1, 2, ..., 16.

If TW is a t-bit space $\{0, 1\}^t$, Nset×$\{1, 2, \ldots, L\}$×$\{1, 2, \ldots, 16\}$ suffices as far as it can be assigned to a t-bit space in 1 to 1 correspondence, and its assigning method is arbitrary. For example, for an integer n, when Nset=$\{0, 1\}^n$, if, out of t bits, first n bits are used as Nset, next $\log_2 L$ bits are used as $\{1, 2, \ldots, L\}$, and the last 4 bits are used as $\{1, 2, \ldots, 16\}$, then a Tweak space can be realized. Note that tweak length $t \geq n + \log_2 L + 4$.

The Tweak value TW is expressed as (x, y, z) where x is a value selected from Nset, y is a value selected from $\{1, 2, \ldots, L\}$, and z is a value selected from $\{1, 2, \ldots, 16\}$.

Operations of Encryption Device 10

Note that the following description is based on a premise that the encryption device 10 and the decryption device 30 share a key K.

Overall operations of the encryption device 10 according to Embodiment 1 will be described with referring to FIG. 3.

(Step S11: Acquisition Process)

The acquisition unit 21 acquires the open data A and the plaintext M. Specifically, the acquisition unit 21 acquires the open data A and the plaintext M which are inputted as a user operates an input device connected via the communication interface 14.

There is a possibility that the open data A is not inputted. In this case, the acquisition unit 21 acquires only the plaintext M.

(Step S12: Dividing Process)

The division unit 22 divides the open data A acquired in step S11, every b bits from the beginning, thereby generating b-bit values $A_1, \ldots, A_{n-1}$ and a value $A_a$ having 1 or more bits to b or less bits. Hence, when the values $A_1, \ldots, A_a$ are bit-coupled, they form open data A.

The division unit 22 also divides the plaintext M acquired in step S11, every bits from the beginning, thereby generating b-bit values $M_1, \ldots, M_{m-1}$ and a value $M_m$ having 1 or more bits to b or less bits. Hence, when the values $M_1, \ldots, M_m$ are bit-coupled, they form a plaintext M.

If open data A is not acquired in step S11, the division unit 22 only generates values $M_1, \ldots, M_m$.

(Step S13: Open Data Process)

The open data processing unit 23 generates a value $H_1$ and a value $H_2$ by using the values $A_1, \ldots, A_a$ generated in step S12. The open data process will be described later in detail.

(Step S14: Encryption Process)

The encryption unit 24 generates a value $S_1(m)$ and a value $S_2(m)$, and a ciphertext C, by using the values $M_1, \ldots, M_m$ generated in step S12 and the value $H_1$ and the value $H_2$ generated in step S13. The encryption process will be described later in detail.

(Step S15: Authenticator Generation Process)

The authenticator generation unit 25 generates a tamper-detection authenticator T by using the value $S_1(m)$ and the value $S_2(m)$ generated in step S14. The authenticator generation process will be described later in detail.

(Step S16: Output Process)

The output unit 26 outputs the ciphertext C generated in step S14 and the authenticator T generated in step S15. Specifically, the output unit 26 transmits the ciphertext C and the authenticator T to the decryption device 30 via the communication interface 14.

The open data process (step S13 of FIG. 3) according to Embodiment 1 will be described with referring to FIGS. 4 and 5.

(Step S131: Initial Assignment Process)

The open data processing unit 23 assigns a b-bit fixed value const1 to a value $H_1(0)$. The open data processing unit 23 also assigns an r-bit fixed value const2 to a value $H_2(0)$.

(Step S132: First Calculation Process)

The H1 calculation unit 231 and the H2 calculation unit 232 perform following calculations (1) and (2) for each integer i of i=1, ..., a−1 in an ascending order.

(1) The H1 calculation unit 231 takes the key K, a Tweak value (const, i, 1), and a value A' which is obtained by calculating an exclusive OR of the value $A_i$ and a value $H_1(i-1)$, as input to the encryption function E of the tweakable block cipher, thereby calculating a value $H_1(i)$. That is, the H1 calculation unit 231 calculates $H_1(i)=E(K, (const, i, 1), A_i \text{ xor } H_1(i-1))$ for each integer i of i=1, ..., a−1 in an ascending order.

(2) The H2 calculation unit 232 calculates a value $H_2(i)$ from the value $H_1(i)$ calculated by the H1 calculation unit 231, and from a value $H_2(i-1)$. Specifically, the H2 calculation unit 232 calculates an exclusive OR of the value $H_2(i-1)$ and r bits which are extracted from the value $H_1(i)$ with using a function trunc[r], thereby generating the value $H_2(i)$. That is, the H2 calculation unit 232 calculates $H_2(i)=H_2(i-1) \text{ xor } \text{trunc}[r](H_1(i))$.

(Step S133: Second Calculation Process)

The H1 calculation unit 231 generates a b-bit value pad($A_a$) from the value $A_a$ with using the function pad. The H1 calculation unit 231 takes the key K, a Tweak value (const, a, 1), and a value $A'_a$ which is obtained by calculating an exclusive OR of the value pad($A_a$) and a value $H_1(a-1)$, as input to the encryption function E of the Tweakable block cipher, thereby calculating a value $H_1(a)$. The H1 calculation unit 231 assigns the value $H_1(a)$ to the value $H_1$. That is, the H1 calculation unit 231 calculates $H_1=H_1(a)=E(K, (const, a, 1), \text{pad}(A_a) \text{ xor } H_1(a-1))$.

The H2 calculation unit 232 calculates an exclusive OR of a value $H_2(a-1)$ and r bits which are extracted from the value $H_1(a)$ with using the function trunc[r], as in step S132, thereby generating a value $H_2(a)$. That is, the H2 calculation unit 232 calculates $H_2(a)=H_2(a-1) \text{ xor } \text{trunc}[r](H_1(a))$.

Figure 3:
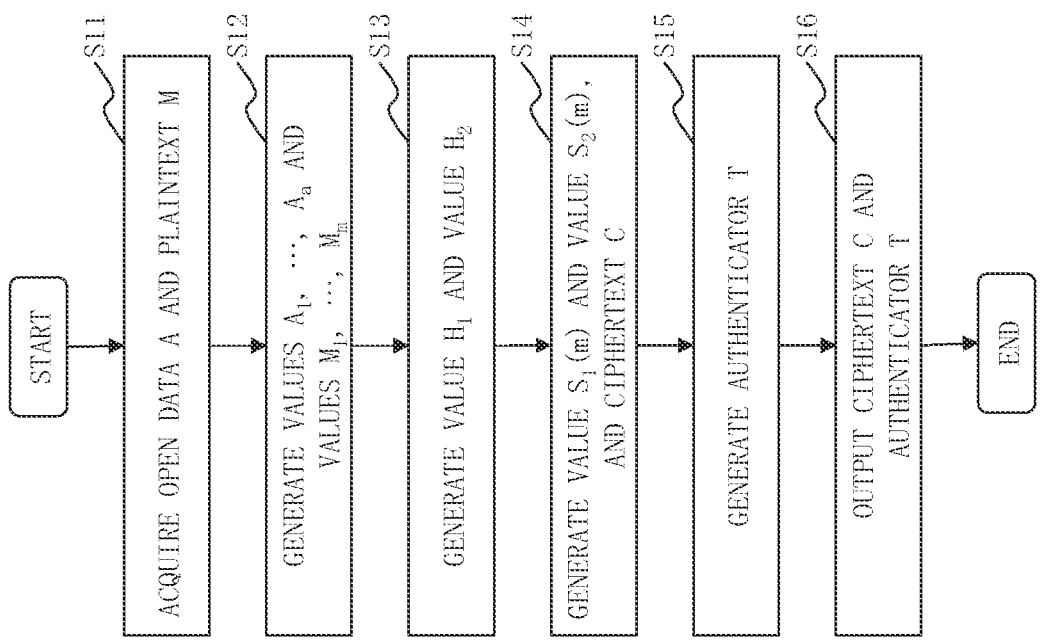
FIG. 3 is a flowchart illustrating overall operations of the encryption device 10 according to Embodiment 1.
Figure 4:
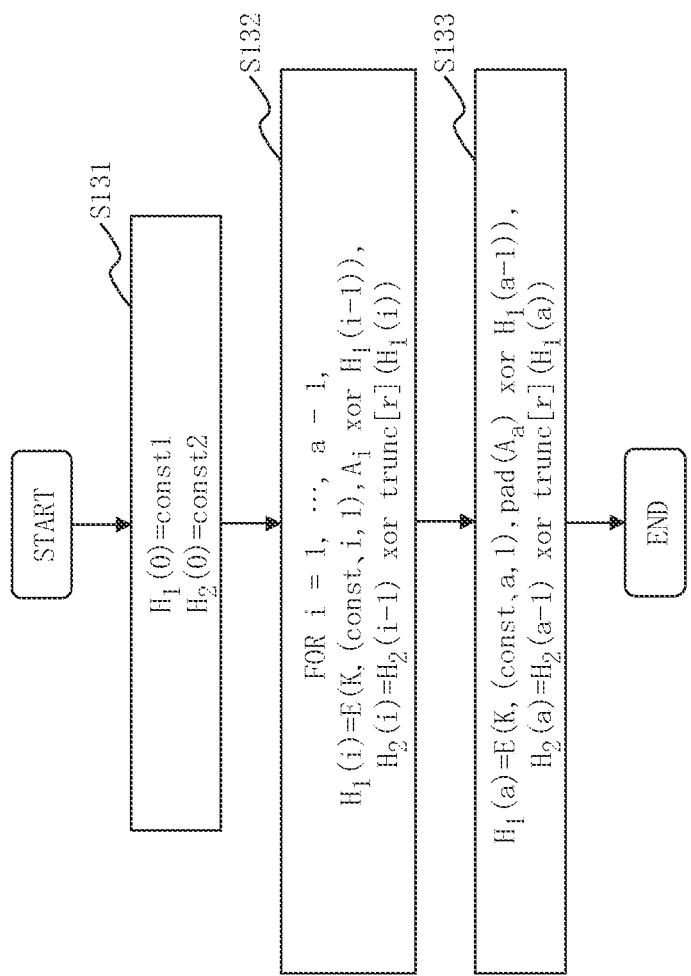
FIG. 4 is a flowchart illustrating an open data process according to Embodiment 1.
Figure 5:
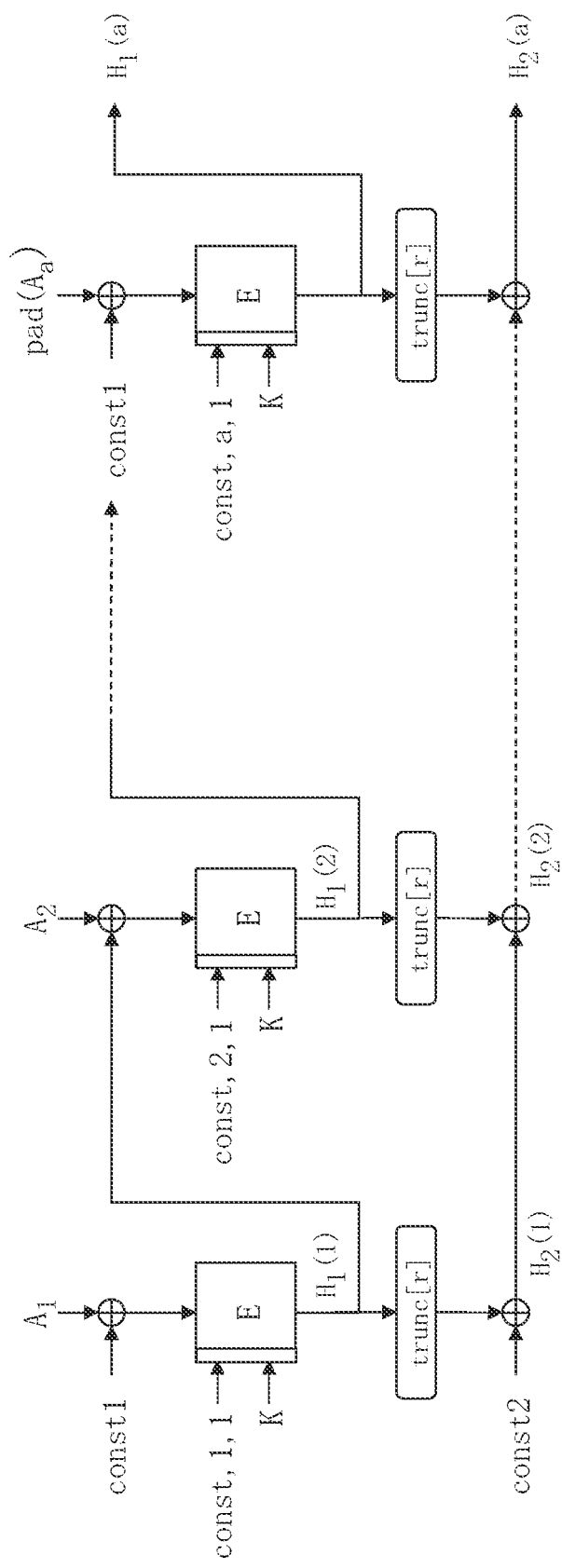
FIG. 5 is an explanatory diagram of the open data process according to Embodiment 1.

If the open data A is not acquired in step S11 of FIG. 3, the open data processing unit 23 assigns the fixed value const1 to the value H and the fixed value const2 to the value $H_2$, in place of performing the processes illustrated in FIGS. 4 and 5.

The encryption process (step S14 of FIG. 3) according to Embodiment 1 will be described with referring to FIGS. 6 and 7.

(Step S141: Initial Assignment Process)

The encryption unit 24 assigns the b-bit value $H_1$ generated in step S133 of FIG. 4 to a value $M_0$. The encryption unit 24 also assigns the r-bit value $H_2$ generated in step S133 of FIG. 4 to a value $S_2(0)$.

(Step S142: Variable Assignment Process)

The encryption unit 24 assigns following values to a variable x in accordance with the open data A.

If the open data A is not acquired in step S11 of FIG. 3, the encryption unit 24 assigns 2 to the variable x.

If the open data A is acquired in step S11 of FIG. 3 and if |A| mod b=0, the encryption unit 24 assigns 7 to the variable x.

If the open data A is acquired in step S11 of FIG. 3 and if |A| mod b≠0, the encryption unit 24 assigns 12 to the variable x, (Step S143: First Calculation Process)

The S1 calculation unit 241 and the S2 calculation unit 242 perform following calculations (1) and (2) for each integer i of i=1, . . . , m−1 in an ascending order.

(1) The S1 calculation unit 241 takes the key K, a Tweak value (N, i, x), and a value $M_{i-1}$, as input to the encryption function E, thereby calculating a value $S_1(i)$, and calculates a value $C_i$ from the value $S_1(i)$ and the value $M_i$. Specifically, the S1 calculation unit 241 calculates an exclusive OR of the value $S_1(i)$ and the value $M_i$, thereby generating the value $C_i$. That is, the S1 calculation unit 241 calculates $S_1(i)$=E(K, (N, i, x), $M_{i-1}$) and $C_i$=$S_1(i)$ xor $M_i$.

(2) The S2 calculation unit 242 calculates a value $S_2(i)$ from the value $S_1(i)$ calculated by the S1 calculation unit 241 and from a value $S_2(i-1)$. Specifically, the S2 calculation unit 242 calculates an exclusive OR of the value $S_2(i-1)$ and r bits which are extracted from the value $S_1(i)$ with using the function trunc[r], thereby calculating the value $S_2(i)$. That is, the S2 calculation unit 242 calculates $S_2(i)$=$S_2(i-1)$ xor trunc[r] ($S_1(i)$).

(Step S144: Second Calculation Process)

The S1 calculation unit 241 takes the key K, a Tweak value (N, m, x), and a value $M_{m-1}$, as input to the encryption function E, thereby calculating the value $S_1(m)$, and calculates a value $C_m$ from the value $S_1(m)$ and the value $M_m$. Specifically, the S1 calculation unit 241 calculates an exclusive OR of the value $M_m$ and |$M_m$| bits which are extracted from the value $S_1(m)$ with using a function trunc[|$M_m$|], thereby generating the value $C_m$. That is, the S1 calculation unit 241 calculates $S_1(m)$=E(K, (N, m, x), $M_{m-1}$) and $C_m$=trunc[|$M_m$|] ($S_1(m)$) xor $M_m$.

The S2 calculation unit 242 calculates an exclusive OR of a value $S_2(m-1)$ and r bits which are extracted from the value $S_1(m)$ with using the function trunc[r], thereby calculating the value $S_2(m)$, as in step S143. That is, the S2 calculation unit 242 calculates $S_2(m)$=$S_2(m-1)$ xor trunc[r] ($S_1(m)$).

(Step S145: Third Calculation Process)

The S1 calculation unit 241 generates a b-bit value pad($C_m$) from the value $C_m$ calculated in step S144, with using the function pad. The S1 calculation unit 241 calculates an exclusive OR of the value pad($C_m$) and the value $S_1(m)$ which is calculated in step S144, thereby updating the value $S_1(m)$. That is, the $S_1$ calculation unit 241 calculates $S_1(m)$=$S_1(m)$ xor pad($C_m$).

(Step S146: Ciphertext Generation Process)

The ciphertext generation unit 243 bit-couples values $C_i$ for each integer i of i=1, . . . , m, thereby generating a ciphertext C. That is, the ciphertext generation unit 243 calculates C=$C_1$||$C_2$|| . . . $C_m$. Note that || expresses bit coupling.

The authentication process (step S15 of FIG. 3) according to Embodiment 1 will be described with referring to FIGS. 8 and 9.

(Step S151: Variable Assignment Process)

The authenticator generation unit 25 assigns following values to a variable y and a variable z in accordance with the open data A and the plaintext M.

If the open data A is not acquired in step S11 of FIG. 3 and if |M| mod b=0, the authenticator generation unit 25 assigns 3 to the variable y and 4 to the variable z.

If the open data A is not acquired in step S11 of FIG. 3 and if |M| mod b=0, the authenticator generation unit 25 assigns 5 to the variable y and 6 to the variable z.

If the open data A is acquired in step S11 of FIG. 3 and if |A| mod b=0 and if |M| mod b=0, the authenticator generation unit 25 assigns 8 to the variable y and 9 to the variable z.

If the open data A is acquired in step S11 of FIG. 3 and if |A| mod b=0 and if |M| mod b≠0, the authenticator generation unit 25 assigns 10 to the variable y and 11 to the variable z.

If the open data A is acquired in step S11 of FIG. 3 and if |A| mod b≠0 and if |M| mod b≠0, the authenticator generation unit 25 assigns 13 to the variable y and 14 to the variable z.

If the open data A is acquired in step S11 of FIG. 3 and if |A| mod b≠0 and if |M| mod b≠0, the authenticator generation unit 25 assigns 15 to the variable y and 16 to the variable z.

(Step S152: First Calculation Process)

Figure 6:
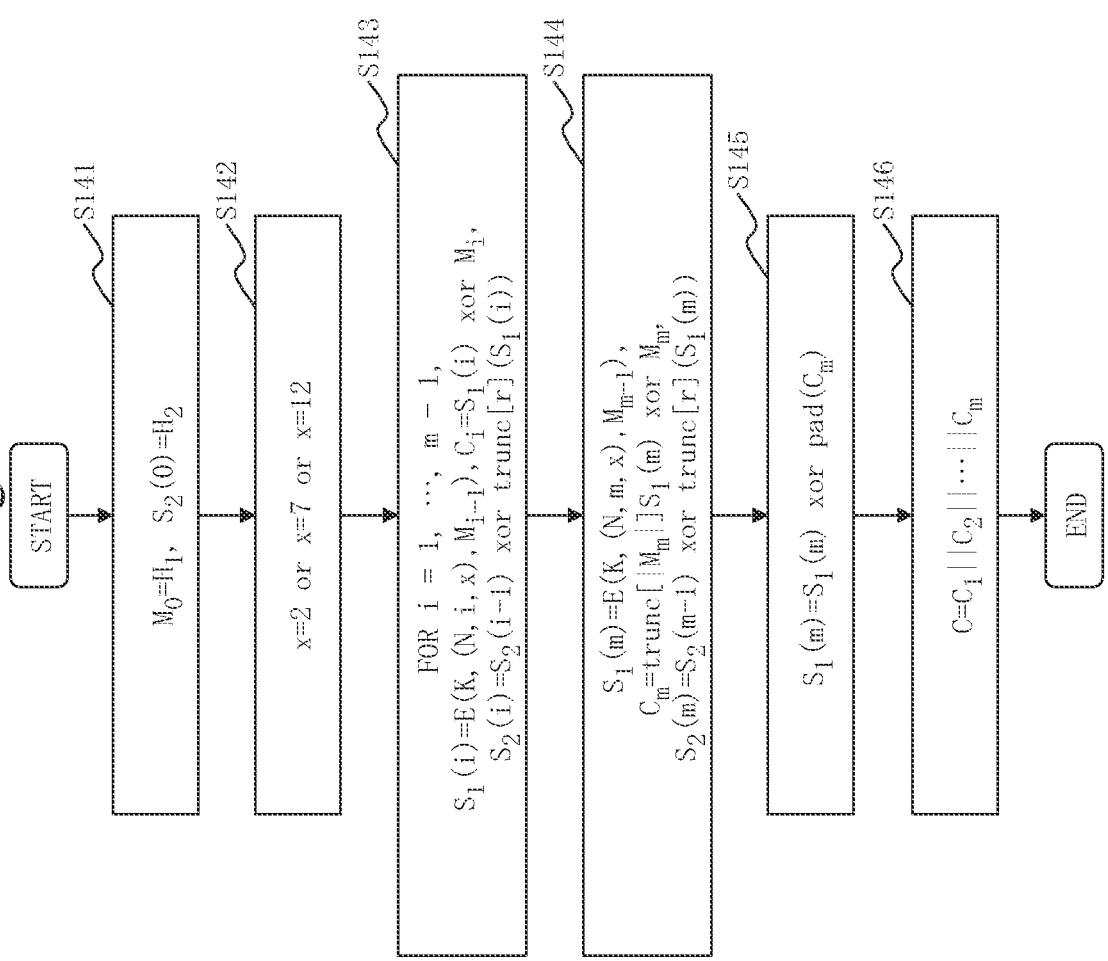
FIG. 6 is a flowchart illustrating an encryption process according to Embodiment 1.
Figure 7:
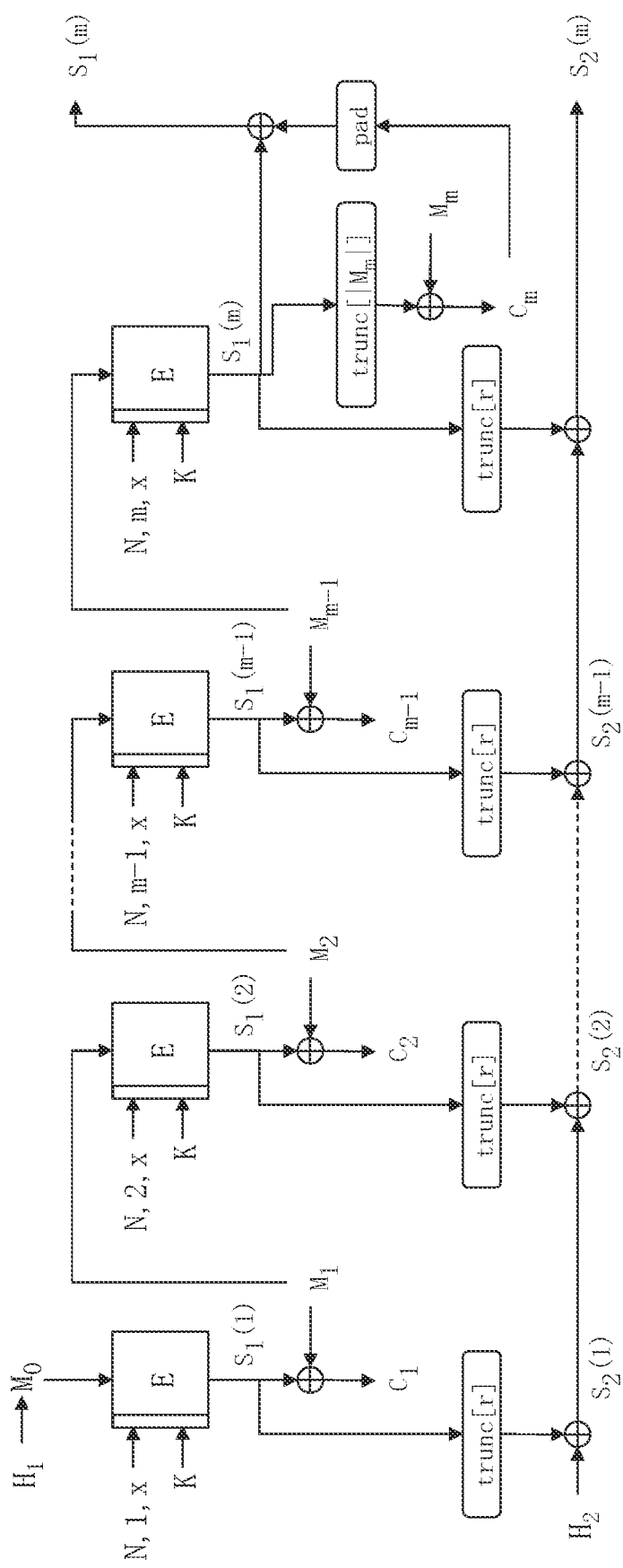
FIG. 7 is an explanatory diagram of the encryption process according to Embodiment 1.

The authenticator generation unit 25 takes the key K, a Tweak value (N, m, y), and the value $S_1(m)$ which is updated in step S145 of FIG. 6, as input to the encryption function E, thereby calculating a value $S_1(m+1)$. That is, the authenticator generation unit 25 calculates $S_1(m+1)$=E(K, (N, n, y), $S_1(m)$).

The authenticator generation unit 25 calculates a value $S_2(m+1)$ from the value $S_1(m+1)$ and the value $S_2(m)$. Specifically, the authenticator generation unit 25 calculates an exclusive OR of the value $S_2(m)$ and r bits which are extracted from the value $S_1(m+1)$ with using the function trunc[r], thereby calculating the value $S_2(m+1)$. That is, the authenticator generation unit 25 calculates $S_2(m+1)$=$S_2(m)$ xor trunc[r] ($S_1(m+1)$).

(Step S153: Second Calculation Process)

The authenticator generation unit 25 takes the key K, a Tweak value (N, m, z), and the value $S_1(m+1)$ which is calculated in step S152, as input to the encryption function E, thereby calculating a value $S_1(m+2)$. That is, the authenticator generation unit 25 calculates $S_1(m+2)$=E(K, (N, m, z), $S_1(m+1)$).

(Step S154: Third Calculation Process)

The authenticator generation unit 25 bit-couples the value $S_1(m+2)$ calculated in step S153 and the value $S_2(m+1)$ calculated in step S152, thereby generating a (b+r)-bit authenticator T. That is, the authenticator generation unit 25 calculates T=$S_1(m+2)$||$S_2(m+1)$.

Figure 10:
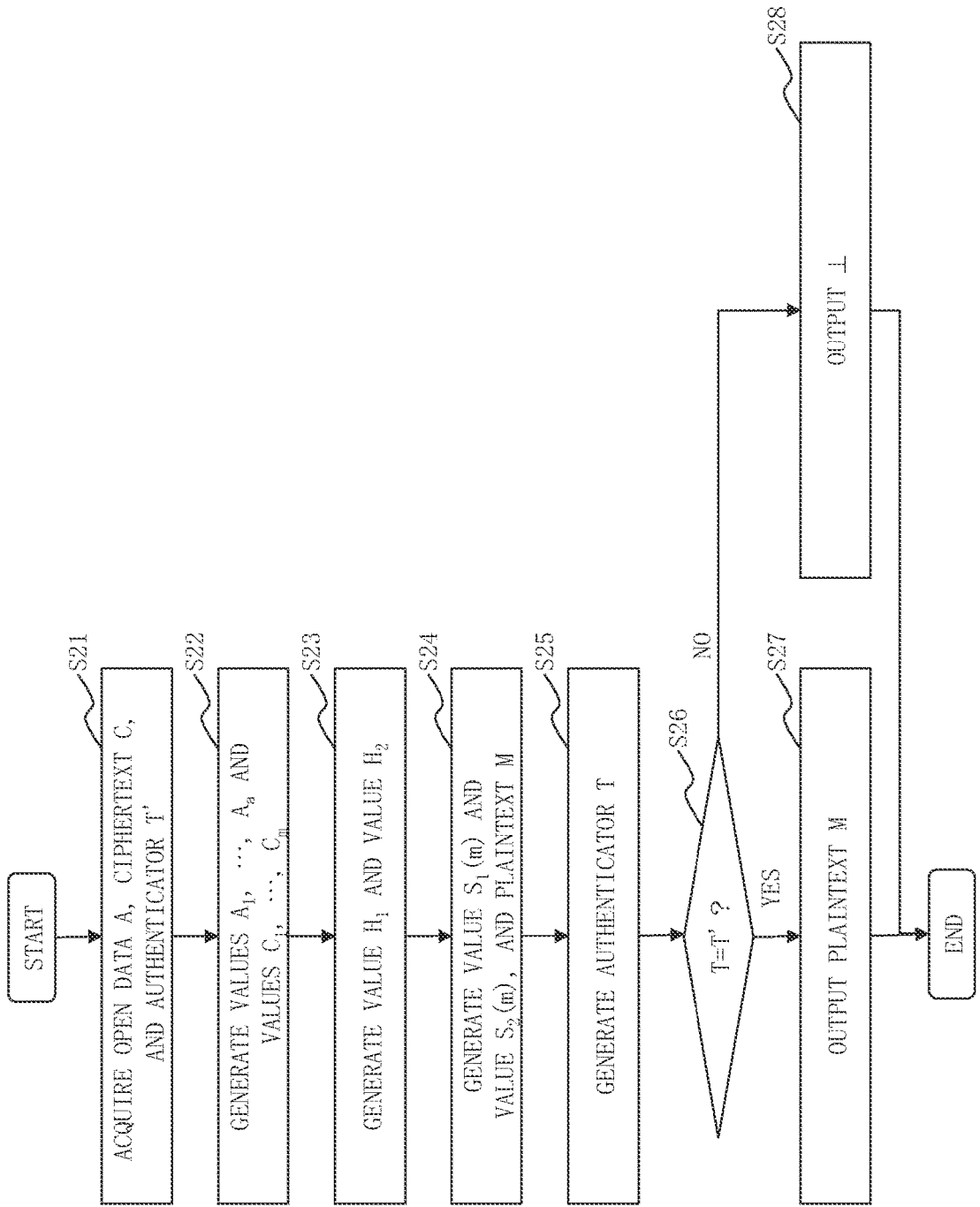
FIG. 10 is a flowchart illustrating overall operations of the decryption device 30 according to Embodiment 1.

Overall operations of the decryption device 30 according to Embodiment 1 will be described with referring to FIG. 10.

(Step S21: Acquisition Process)

The acquisition unit 41 acquires the open data A, the ciphertext, and an authenticator T'.

Specifically, the acquisition unit 41 acquires the open data A that has been inputted as a user operates an input device connected via the communication interface 34. Via the communication interface 34, the acquisition unit 41 also acquires the ciphertext C transmitted in step S16 of FIG. 3 and acquires, as the authenticator T, the authenticator T transmitted in step S16 of FIG. 3.

There is a possibility that open data A is not inputted. In this case, the acquisition unit 41 acquires only the ciphertext C and the authenticator T. If open data A is not inputted in step S11 of FIG. 3, open data A is not inputted in step S21 either. On the other hand, if open data A is inputted in step S11 of FIG. 3, open data A is also inputted in step S21.

(Step S22: Dividing Process)

The division unit 42 divides the open data A acquired in step S21, every b bits from the beginning, thereby generating b-bit values $A_1, \ldots, A_{a-1}$ and a value $A_a$ having 1 or more bits to b or less bits. Hence, when the values $A_1, \ldots, A_a$ are bit-coupled, they form open data A.

The division unit 42 also divides the ciphertext C acquired in step S21, every b bits from the beginning, thereby generating b-bit values $C_1, \ldots, C_{m-1}$ and a value $C_m$ having 1 or more bits to b or less bits. Hence, when the values $C_1, \ldots, C_m$ are bit-coupled, they form the ciphertext C.

If open data A is not acquired in step S21, the division unit 42 only generates values $C_1, \ldots, C_m$.

(Step S23: Open Data Process)

The open data processing unit 43 generates a value $H_1$ and a value $H_2$ by using the values $A_1, \ldots, A_a$ generated in step S22, as in step S13 of FIG. 3. That is, the open data processing unit 43 generates the value $H_1$ and the value $H_2$ by the method described with referring to FIGS. 4 and 5.

(Step S24: Decryption Process)

The decryption unit 44 generates a value $S_1(m)$ and a value $S_2(m)$, and a plaintext M, by using the values $C_1, \ldots, C_m$ generated in step S22 and the value $H_1$ and the value $H_2$ generated in step S23. The decryption process will be described later in detail.

(Step 25: Authenticator Generation Process)

The authenticator generation unit 45 generates a tamper-detection authenticator T by using the value $S_1(m)$ and the value $S_2(m)$ generated in step S24, as in step S15 of FIG. 3. That is, the authenticator generation unit 45 generates the authenticator T by the method described with referring to FIGS. 8 and 9.

(Step S26: Tamper Judgment Process)

The authenticator generation unit 25 judges whether the authenticator T generated in step S25 and the authenticator T generated in step S21 coincide with each other or not.

If the authenticator T and the authenticator T coincide, the authenticator generation unit 25 judges that they are not tampered, and advances the process to step S27. If the authenticator T and the authenticator T do not coincide, the authenticator generation unit 25 judges that they are tampered, and advances the process to step S28.

(Step S27: First Output Process)

The output unit 26 outputs the plaintext M generated in step S24. Specifically, the output unit 26 transmits the plaintext M to a user terminal or the like via the communication interface 14.

(Step S28: Second Output Process)

The output unit 26 outputs a value 1 indicating that forging has been done.

Figure 11:
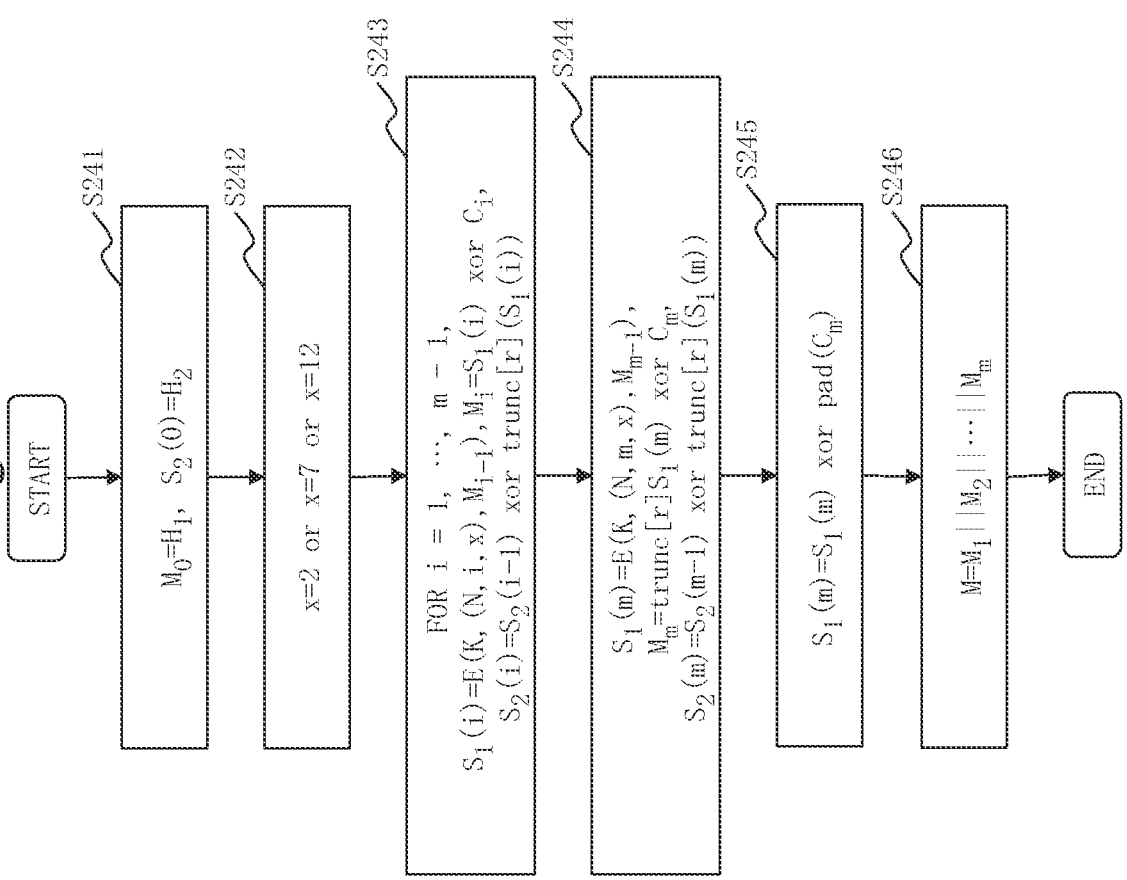
FIG. 11 is a flowchart illustrating a decryption process according to Embodiment 1.
Figure 12:
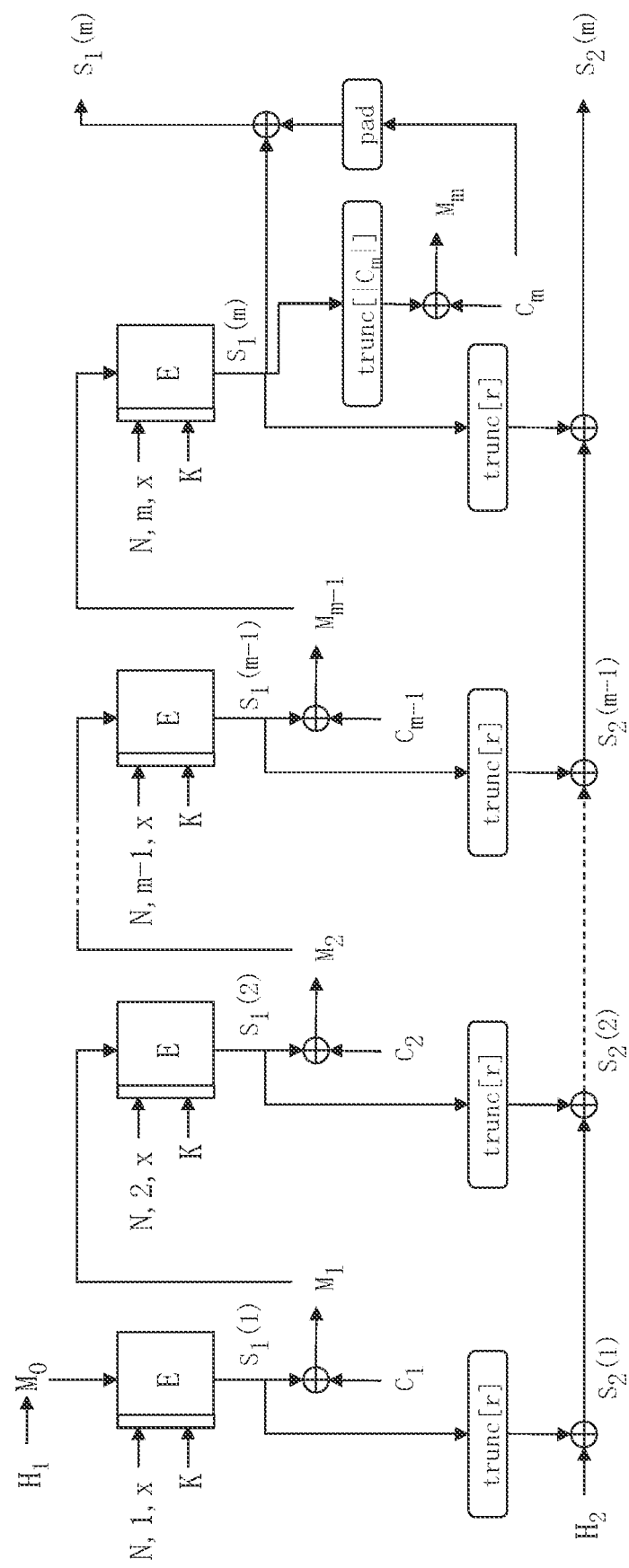
FIG. 12 is an explanatory diagram of the decryption process according to Embodiment 1.

The decryption process (step S24 of FIG. 10) according to Embodiment 1 will be described with referring to FIGS. 11 and 12.

Processes from step S241 through step S242 are the same as processes S141 through step S142 of FIG. 6. Also, a process of step S245 is the same as a process of step S145 of FIG. 6.

(Step S243: First Calculation Process)

The S1 calculation unit 441 and the S2 calculation unit 442 perform following calculations (1) and (2) for each integer i of $i=1, \ldots, m-1$ in an ascending order.

(1) The S1 calculation unit 441 takes the key K, a Tweak value (N, i, x), and a value $M_{i-1}$, as input to the encryption function E, thereby calculating a value $S_1(i)$, as in step S143 of FIG. 6. The S1 calculation unit 441 also calculates a value $M_i$ from the value $S_1(i)$ and the value $C_i$. Specifically, the S1 calculation unit 441 calculates an exclusive OR of the value $S_1(i)$ and the value $C_i$, thereby generating the value $M_i$. That is, the S1 calculation unit 241 calculates $S_1(i)=E(K, (N, i, x), M_{i-1})$ and $M_i=S_1(i)$ xor $C_i$.

(2) The S2 calculation unit 442 calculates a value $S_2(i)$ from the value $S_1(i)$ calculated by the S1 calculation unit 441 and from a value $S_2(i-1)$, as in step S143 of FIG. 6. Specifically, the S2 calculation unit 442 calculates an exclusive OR of the value $S_2(i-1)$ and r bits which are extracted from the value $S_1(i)$ with using the function trunc[r], thereby calculating the value $S_2(i)$. That is, the S2 calculation unit 442 calculates $S_2(i)=S_2(i-1)$ xor trunc[r] $(S_1(i))$.

(Step S244: Second Calculation Process)

The S1 calculation unit 441 takes the key K, a Tweak value (N, n, x), and a value $M_{m-1}$, as input to the encryption function E, thereby calculating the value $S_1(m)$, as in step S144 of FIG. 6. The S1 calculation unit 441 also calculates a value $M_m$ from the value $S_1(m)$ and the value $C_m$. Specifically, the S1 calculation unit 441 calculates an exclusive OR of the value $C_m$ and $|C_m|$ bits which are extracted from the value $S_1(m)$ with using a function trunc$[|C_m|]$, thereby generating the value $M_m$. That is, the S1 calculation unit 441 calculates $S_1(m)=E(K, (N, m, x), M_{m-1})$ and $M_m$=trunc$[|C_m|](S_1(m))$ xor $C_m$.

The S2 calculation unit 442 calculates an exclusive OR of a value $S_2(m-1)$ and r bits which are extracted from the value $S_1(m)$ with using the function trunc[r], thereby calculating the value $S_2(m)$, as in step S144 of FIG. 6. That is, the S2 calculation unit 442 calculates $S_2(m)=S_2(m-1)$ xor trunc[r] $(S_1(m))$.

(Step S246: Plaintext Generation Process)

The plaintext generation unit 443 bit-couples values $M_i$ for each integer i of $i=1, \ldots, m$, thereby generating a plaintext M. That is, the plaintext generation unit 443 calculates $M=M_1\|M_2\| \ldots M_m$.

*Effect of Embodiment 1*

As has been described above, the encryption device 10 according to Embodiment 1 updates a b-bit value $S_1$ with using the encryption function E, and updates an r-bit value with using the output from the encryption function E. With this configuration, in decrypting, the decryption device 30 updates a (b+r)-bit value. As a result, bit security of (b+r) bits can be achieved.

*Other Configurations*

<Modification 1>

Figure 8:
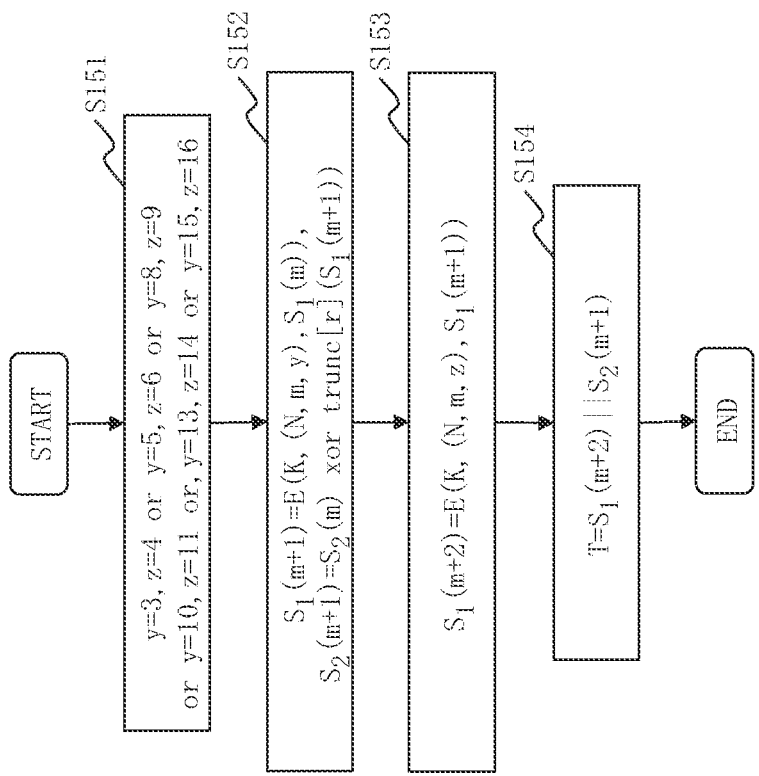
FIG. 8 is a flowchart illustrating an authenticator generation process according to Embodiment 1.
Figure 9:
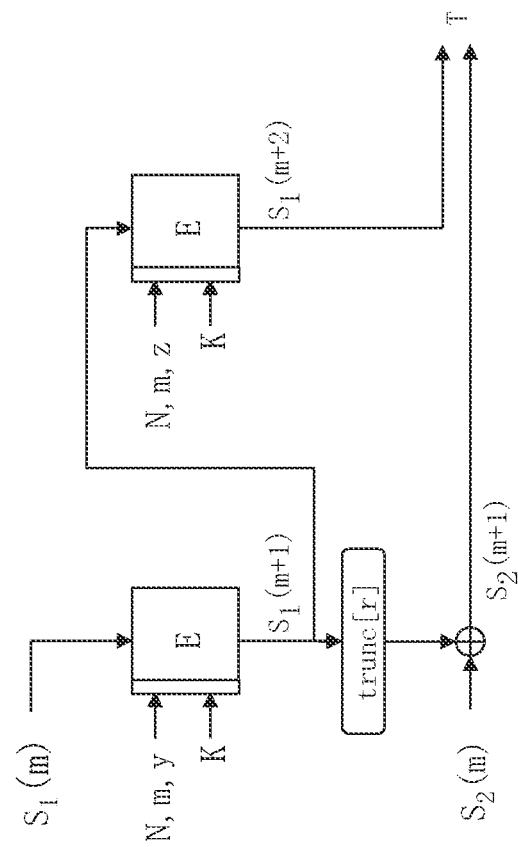
FIG. 9 is an explanatory diagram of the authenticator generation process according to Embodiment 1.
Figure 13:
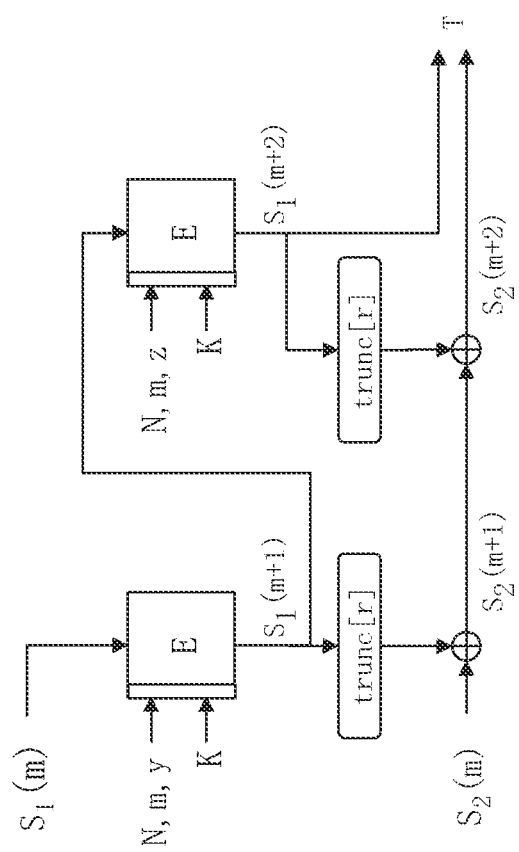
FIG. 13 is an explanatory diagram of an authenticator generation process according to Modification 1.

In Embodiment 1, only the value $S_1(m+2)$ is calculated in step S153 of FIG. 8. Alternatively, in addition to the value $S_1(m+2)$, a value $S_2(m+2)$ may also be calculated. Specifically, as illustrated in FIG. 13, the authenticator generation unit 25 calculates an exclusive OR of the value $S_2(m+1)$ and r bits which are extracted from the value $S_1(m+2)$ with using the function trunc[r], thereby calculating the value $S_2(m+2)$. That is, the authenticator generation unit 25 calculates $S_2(m+2)=S_2(m+1)$ xor trunc[r] $(S_1(m+2))$.

In this case, in step S154 of FIG. 8, the authenticator generation unit 25 bit-couples the value $S_1(m+2)$ and value $S_2(m+2)$, thereby generating an authenticator T. That is, the authenticator generation unit 25 calculates $T=S_1(m+2)\|S_2(m+2)$.

<Modification 2>

In Embodiment 1, the function constituent elements are implemented by software. Alternatively, Modification 2 may be possible in which the function constituent elements are implemented by hardware. Modification 2 will be described by focusing on its difference from Embodiment 1.

Figure 14:
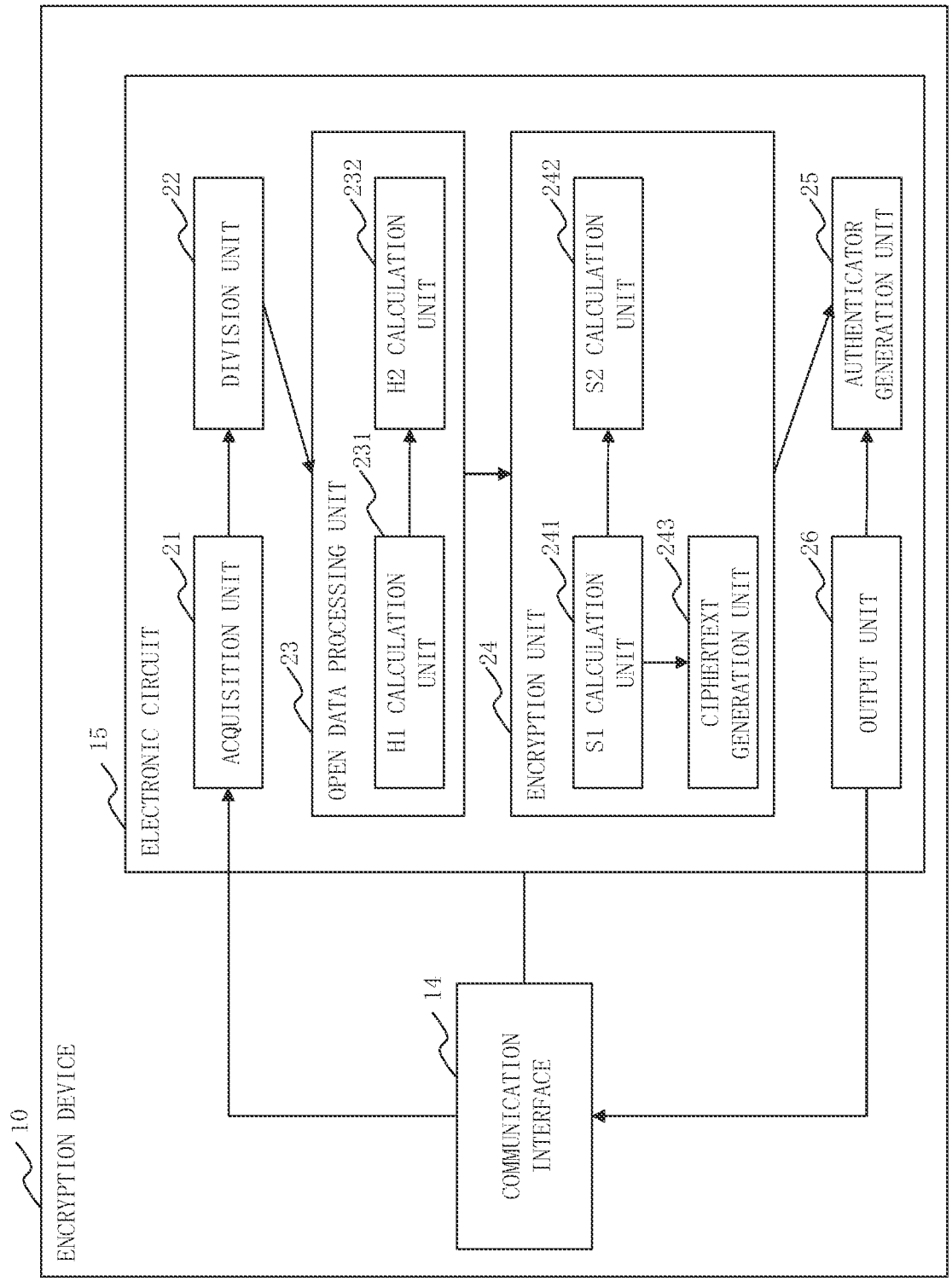
FIG. 14 is a configuration diagram of an encryption device 10 according to Modification 2.

A configuration of an encryption device 10 according to Modification 2 will be described with referring to FIG. 14.

When the function constituent elements are implemented by hardware, the encryption device 10 is provided with an electronic circuit 15, in place of the processor 11, the memory 12, and the storage 13. The electronic circuit 15 is a dedicated circuit that implements the functions of the function constituent elements and the functions of the memory 12 and storage 13.

Figure 15:
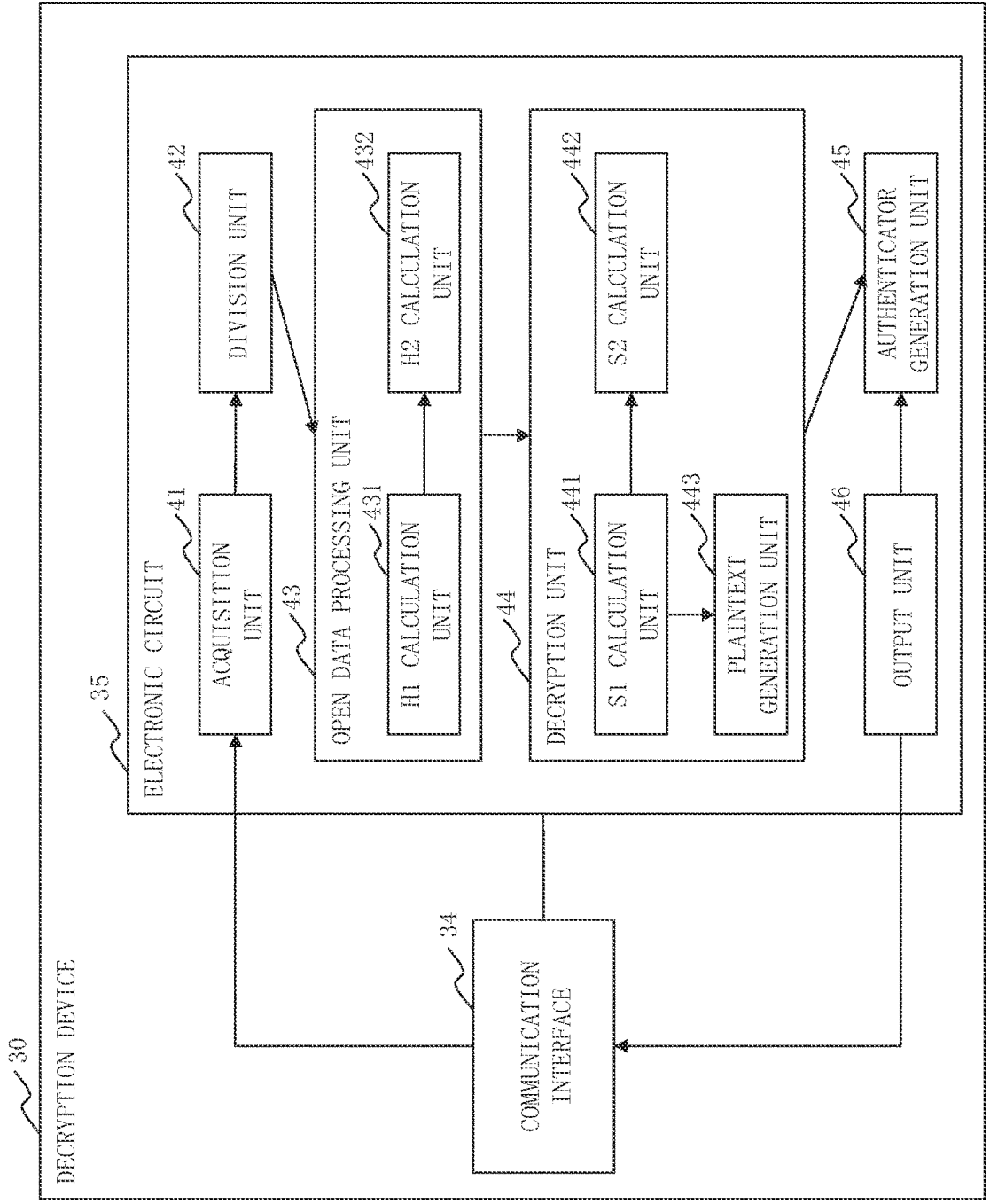
FIG. 15 is a configuration diagram of a decryption device 30 according to Modification 2.

A configuration of a decryption device 30 according to Modification 2 will be described with referring to FIG. 15.

When the function constituent elements are implemented by hardware, the decryption device 30 is provided with an electronic circuit 35, in place of the processor 31, the memory 32, and the storage 33. The electronic circuit 35 is a dedicated circuit that implements the functions of the function constituent elements and the functions of the memory 32 and storage 33.

As the electronic circuit 15 or 35, a single circuit, a composite circuit, a programmed processor, a parallel-programmed processor, a logic IC, a Gate Array (GA), an Application Specific Integrated circuit (ASIC), and a Field-Programmable Gate Array (FPGA) will be considered.

The function constituent elements may be implemented by one electronic circuit 15 or 35. The function constituent elements may be implemented by a plurality of electronic circuits 15 or 35 by distribution.

<Modification 3>

Modification 3 may be possible in which some of the function constituent elements are implemented by hardware and the remaining function constituent elements are implemented by software.

The processors 11 and 31, the memories 12 and 32, the storages 13 and 33, and the electronic circuits 15 and 35 are referred to as processing circuitry. That is, the functions of the function constituent elements are implemented by processing circuitry.

REFERENCE SIGNS LIST

10: encryption device; 11: processor; 12: memory; 13: storage; 14: communication interface; 15: electronic circuit; 21: acquisition unit; 22: division unit; 23: open data processing unit; 231: H1 calculation unit; 232: H2 calculation unit; 24: encryption unit; 241: S1 calculation unit; 242: S2 calculation unit; 243: ciphertext generation unit; 25: authenticator generation unit; 26: output unit; 30: decryption device; 31: processor; 32: memory; 33: storage; 34: communication interface; 35: electronic circuit; 41: acquisition unit; 42: division unit; 43: open data processing unit; 431: H1 calculation unit; 432: H2 calculation unit; 44: decryption unit; 441: S1 calculation unit; 442: S2 calculation unit; 443: plaintext generation unit; 45: authenticator generation unit; 46: output unit.

The invention claimed is:

1. An encryption device comprising:
processing circuitry to:
acquire a plaintext M;
divide the acquired plaintext M, every b bits from a beginning, the b bits being a block size of an encryption function E of a block cipher, thereby generating b-bit values $M_1, \ldots, M_{m-1}$ and a value $M_m$ having 1 or more bits to b or less bits;
assign a b-bit value $H_1$ to a value $M_0$, and for each integer i of i=1, . . . , m in an ascending order, to take a value $M_{i-1}$ as input to the encryption function E, thereby calculating a value $S_1(i)$, and to calculate a value $C_i$ from the value $S_1(i)$ and a value $M_i$;
assign an r-bit value $H_2$ to a value $S_2(0)$, and for each integer i of i=1, . . . , m in an ascending order, to calculate a value $S_2(i)$ from the calculated value $S_1(i)$ and from a value $S_2(i-1)$;
generate a ciphertext C from a value $C_i$ for each integer i of i=1, . . . , m; and
generate a (b+r)-bit authenticator T by using a value $S_1(m)$ and a value $S_2(m)$.

2. The encryption device according to claim 1,
wherein the processing circuitry calculates an exclusive OR of the value $S_2(i-1)$ and r bits out of the value $S_1(i)$, thereby calculating the value $S_2(i)$.

3. The encryption device according to claim 1,
wherein the processing circuitry
calculates an exclusive OR of the value $S_1(i)$ and the value $M_i$ for each integer i of i=1, . . . , m, thereby generating the value $C_i$, and
bit-couples the values $C_i$ for each integer i of i=1, . . . , m, thereby generating the ciphertext C.

4. The encryption device according to claim 1,
wherein the processing circuitry, for each integer i of i=m+1 and i=m+2 in an ascending order, takes a value $S_1(i-1)$ as input to the encryption function E, thereby calculating a value $S_1(i)$, and for an integer i including at least m+1 between i=m+1 and i=m+2, calculates an exclusive OR of r bits out of the value $S_1(i)$ and the value $S_2(i-1)$, thereby calculating the value $S_2(i)$, and bit-couples a value $S_1(m+2)$ and a value $S_2(m+1)$ or a value $S_2(m+2)$, thereby generating the authenticator T.

5. The encryption device according to claim 1,
wherein the processing circuitry
acquires open data A,
divides the open data A every b bits from a beginning, thereby generating b-bit values $A_1, \ldots, A_{a-1}$ and a value $A_a$ having 1 or more bits to b or less bits, and
assigns a b-bit fixed value const1 to a value $H_1(0)$, and for each integer i of i=1, . . . , a in an ascending order, to take a value $A'_i$ obtained by calculating an exclusive OR of a value $A_i$ and a value $H_1(i-1)$, as input to the encryption function E, thereby calculating a value $H_1(i)$, and to assign a value $H_1(a)$ to the value $H_1$; and
assigns an r-bit fixed value const2 to a value $H_2(0)$, and for each integer i of i=1, . . . , a in an ascending order, to calculate a value $H_2(i)$ from the calculated value $H_1(i)$ and from a value $H_2(i-1)$, and to assign a value $H_2(a)$ to the value $H_2$.

6. The encryption device according to claim 1,
wherein the block cipher is a Tweakable block cipher, and
wherein the processing circuitry takes a different Tweak value for each integer i of i=1, . . . , m, as input to the encryption function E, thereby calculating the value $S_1(i)$.

7. A decryption device comprising:
processing circuitry to:
acquires a ciphertext C and an authenticator T';
divides the acquired ciphertext C, every b bits from a beginning, the b bits being a block size of an encryption function E of a block cipher, thereby generating b-bit values $C_1, \ldots, C_{m-1}$ and a value $C_m$ having 1 or more bits to b or less bits;
assigns a b-bit value $H_1$ to a value $M_0$, and for each integer i of i=1, . . . , m in an ascending order, to take a value $M_{i-1}$ as input to the encryption function E, thereby calculating a value $S_1(i)$, and to calculate a value $M_i$ from the value $S_1(i)$ and a value $C_i$;

assigns an r-bit value $H_2$ to a value $S_2(0)$, and for each integer i of i=1, ..., m in an ascending order, to calculate a value $S_2(i)$ from the calculated value $S_1(i)$ and from a value $S_2(i-1)$;

generates a plaintext M from a value $M_i$ for each integer i of i=1, ..., m; and generates a (b+r)-bit authenticator T by using a value $S_1(m)$ and a value $S_2(m)$, and to judge whether the authenticator T and the authenticator T' coincide or not.

8. The decryption device according to claim 7, wherein the processing circuitry calculates an exclusive OR of the value $S_2(i-1)$ and r bits out of the value $S_1(i)$, thereby calculating the value $S_2(i)$.

9. The decryption device according to claim 7, wherein the processing circuitry calculates an exclusive OR of the value $S_1(i)$ and the value $C_i$ for each integer i of i=1, ..., m, thereby generating the value $M_i$, and bit-couples the values $M_i$ for each integer i of i=1, ..., m, thereby generating the plaintext M.

10. The decryption device according to claim 7, wherein the processing circuitry, for each integer i of i=m+1 and i=m+2 in an ascending order, takes a value $S_1(i-1)$ as input to the encryption function E, thereby calculating a value $S_1(i)$, and for an integer i including at least m+1 between i=m+1 and i=m+2, calculates an exclusive OR of r bits out of the value $S_1(i)$ and the value $S_2(i-1)$, thereby calculating the value $S_2(i)$, and bit-couples a value $S_1(m+2)$ and a value $S_2(m+1)$ or a value $S_2(m+2)$, thereby generating the authenticator T.

11. The decryption device according to claim 7, wherein the processing circuitry acquires open data A, divides the open data A every b bits from a beginning, thereby generating b-bit values $A_1, \ldots, A_{a-1}$ and a value $A_a$ having 1 or more bits to b or less bits, and assigns a b-bit fixed value const1 to a value $H_1(0)$, and for each integer i of i=1, ..., a in an ascending order, to take a value $A'_i$ obtained by calculating an exclusive OR of a value $A_i$ and a value $H_1(i-1)$, as input to the encryption function E, thereby calculating a value $H_1(i)$, and to assign a value $H_1(a)$ to the value $H_1$; and assigns an r-bit fixed value const2 to a value $H_2(0)$, and for each integer i of i=1, ..., a in an ascending order, to calculate a value $H_2(i)$ from the calculated value $H_1(i)$ and from a value $H_2(i-1)$, and to assign a value $H_2(a)$ to the value $H_2$.

12. The decryption device according to claim 7, wherein the block cipher is a Tweakable block cipher, and wherein the processing circuitry takes a different Tweak value for each integer i of i=1, ..., m, as input to the encryption function E, thereby calculating the value $S_1(i)$.

13. An encryption method comprising:

acquiring a plaintext M;

dividing the plaintext M every b bits from a beginning, the b bits being a block size of an encryption function E of a block cipher, thereby generating b-bit values $M_1, \ldots, M_{m-1}$ and a value $M_m$ having 1 or more bits to b or less bits;

assigning a b-bit value $H_1$ to a value $M_0$, and for each integer i of i=1, ..., m in an ascending order, taking a value $M_{i-1}$ as input to the encryption function E, thereby calculating a value $S_1(i)$, and calculating a value $C_i$ from the value $S_1(i)$ and a value $M_i$;

assigning an r-bit value $H_2$ to a value $S_2(0)$, and for each integer i of i=1, ..., m in an ascending order, calculating a value $S_2(i)$ from the value $S_1(i)$ and a value $S_2(i-1)$;

generating a ciphertext C from a value $C_i$ for each integer i of i=1, ..., m; and generating a (b+r)-bit authenticator T by using a value $S_1(m)$ and a value $S_2(m)$.

14. A decryption method comprising:

acquiring a ciphertext C and an authenticator T';

dividing the ciphertext C every b bits from a beginning, the b bits being a block size of an encryption function E of a block cipher, thereby generating b-bit values $C_1, \ldots, C_{m-1}$ and a value $C_m$ having 1 or more bits to b or less bits;

assigning a b-bit value $H_1$ to a value $M_0$, and for each integer i of i=1, ..., m in an ascending order, taking a value $M_{i-1}$ as input to the encryption function E, thereby calculating a value $S_1(i)$, and calculating a value $M_i$ from the value $S_1(i)$ and a value $C_i$;

assigning an r-bit value $H_2$ to a value $S_2(0)$, and for each integer i of i=1, ..., m in an ascending order, calculating a value $S_2(i)$ from the value $S_1(i)$ and a value $S_2(i-1)$;

generating a plaintext M from a value $M_i$ for each integer i of i=1, ..., m; and generating a (b+r)-bit authenticator T by using a value $S_1(m)$ and a value $S_2(m)$, and judging whether the authenticator T and the authenticator T' coincide or not.

15. A non-transitory computer readable medium storing an encryption program which causes a computer to function as an encryption device that performs:

an acquisition process of acquiring a plaintext M;

a division process of dividing the plaintext M acquired by the acquisition process, every b bits from a beginning, the b bits being a block size of an encryption function E of a block cipher, thereby generating b-bit values $M_1, \ldots M_{m-1}$ and a value $M_m$ having 1 or more bits to b or less bits;

an S1 calculation process of assigning a b-bit value $H_1$ to a value $M_0$, and for each integer i of i=1, ..., m in an ascending order, taking a value $M_{i-1}$ as input to the encryption function E, thereby calculating a value $S_1(i)$, and calculating a value $C_i$ from the value $S_1(i)$ and a value $M_i$;

an S2 calculation process of assigning an r-bit value $H_2$ to a value $S_2(0)$, and for each integer i of i=1, ..., m in an ascending order, calculating a value $S_2(i)$ from the value $S_1(i)$ calculated by the S1 calculation process and from a value $S_2(i-1)$;

a ciphertext generation process of generating a ciphertext C from a value $C_i$ for each integer i of i=1, ..., m; and an authenticator generation process of generating a (b+r)-bit authenticator T by using a value $S_1(m)$ and a value $S_2(m)$.

16. A non-transitory computer readable medium storing a decryption program which causes a computer to function as an decryption device that performs:

an acquisition process of acquiring a ciphertext C and an authenticator T';

a division process of dividing the ciphertext C acquired by the acquisition process, every b bits from a beginning, the b bits being a block size of an encryption function E of a block cipher, thereby generating b-bit values $C_1, \ldots, C_{m-1}$ and a value $C_m$ having 1 or more bits to b or less bits;

an S1 calculation process of assigning a b-bit value $H_1$ to a value $M_0$, and for each integer i of i=1, . . . , m in an ascending order, taking a value $M_{i-1}$ as input to the encryption function E, thereby calculating a value $S_1(i)$, and calculating a value $M_i$ from the value $S_1(i)$ and a value $C_i$;

an S2 calculation process of assigning an r-bit value $H_2$ to a value $S_2(0)$, and for each integer i of i=1, . . . , m in an ascending order, calculating a value $S_2(i)$ from the value $S_1(i)$ calculated by the S1 calculation process and from a value $S_2(i-1)$;

a plaintext generation process of generating a plaintext M from a value $M_i$ for each integer i of i=1, . . . , m; and an authenticator generation process of generating a (b+r)-bit authenticator T by using a value $S_1(m)$ and a value $S_2(m)$, and judging whether the authenticator T and the authenticator T' coincide or not.

\* \* \* \* \*